United States Patent
Hajimusa et al.

(10) Patent No.: US 10,409,406 B2
(45) Date of Patent: Sep. 10, 2019

(54) SYSTEMS AND METHODS FOR INCREASED SECURITY IN AUTHENTICATION CODE ENTRY FOR TOUCH-SENSITIVE SCREEN ENABLED DEVICES

(71) Applicant: VeriFone, Inc., San Jose, CA (US)

(72) Inventors: Imran A. Hajimusa, San Jose, CA (US); Glen Robson, Morgan Hill, CA (US)

(73) Assignee: VeriFone, Inc., San Jose, CA (US)

( * ) Notice: Subject to any disclaimer, the term of this patent is extended or adjusted under 35 U.S.C. 154(b) by 0 days.

(21) Appl. No.: 15/713,095

(22) Filed: Sep. 22, 2017

(65) Prior Publication Data

US 2018/0253176 A1 Sep. 6, 2018

Related U.S. Application Data

(60) Provisional application No. 62/466,416, filed on Mar. 3, 2017.

(51) Int. Cl.
  *G06F 3/041* (2006.01)
  *G06F 21/31* (2013.01)
  *G06K 9/00* (2006.01)
  *G06F 3/0488* (2013.01)
  *H04W 12/06* (2009.01)

(52) U.S. Cl.
  CPC ........ *G06F 3/0412* (2013.01); *G06F 3/04886* (2013.01); *G06F 21/31* (2013.01); *G06K 9/00006* (2013.01); *H04W 12/06* (2013.01)

(58) Field of Classification Search
  CPC .... G06F 3/0412; G06F 3/04886; G06F 21/30; G06F 21/31; G06K 9/00006
  See application file for complete search history.

(56) References Cited

U.S. PATENT DOCUMENTS 4,333,090 A 6/1982 Hirsch
4,479,112 A 10/1984 Hirsch
(Continued)

FOREIGN PATENT DOCUMENTS

DE 4129202 3/1993
DE 202004009042 9/2004
(Continued)

OTHER PUBLICATIONS

European Communication by the European Patent Office, European Patent Application No. 17192741.1, dated Apr. 5, 2018, pp. 1-11.
(Continued)

*Primary Examiner* — Lisa S Landis
(74) *Attorney, Agent, or Firm* — Greenberg Traurig LLP

(57) ABSTRACT

Systems and methods for increased security in authentication code entry for touch-sensitive screen enabled devices are disclosed. According to one embodiment, a method for enhanced security in entering data to a data entry device comprising at least one computer processor and a touch-sensitive screen may include (1) the touch-sensitive screen displaying a touch instruction, the instruction indicating a touch location where a user touch is to be made on the touch-sensitive screen; (2) the touch-sensitive screen sensing a first touch; and (3) the at least one computer processor determining that the first touch is within a predetermined threshold of the touch location indicated by the touch instruction.

19 Claims, 18 Drawing Sheets

(56) References Cited

U.S. PATENT DOCUMENTS

| | | |
|---|---|---|
| 6,317,835 B1 | 11/2001 | Bilger et al. |
| 6,549,194 B1 | 4/2003 | McIntyre et al. |
| 8,579,190 B2 | 11/2013 | Golueke et al. |
| 2008/0222417 A1 | 9/2008 | Downes |
| 2009/0241072 A1 | 9/2009 | Chaudhri et al. |
| 2010/0083111 A1* | 4/2010 | de los Reyes ........ G06F 3/0482 715/702 |
| 2011/0006996 A1 | 1/2011 | Smith et al. |
| 2011/0283241 A1* | 11/2011 | Miller ................ G06F 3/04883 715/863 |
| 2012/0174042 A1 | 7/2012 | Chang |
| 2012/0268393 A1 | 10/2012 | Lee |
| 2013/0159927 A1* | 6/2013 | Chuang ................ G06F 3/0488 715/810 |
| 2013/0174247 A1 | 7/2013 | Stedman |
| 2014/0047525 A1 | 2/2014 | Bonhoff |
| 2017/0154179 A1 | 6/2017 | Corrion et al. |
| 2017/0235962 A1 | 8/2017 | Clark |

FOREIGN PATENT DOCUMENTS

| | | |
|---|---|---|
| EP | 2458491 | 1/2015 |
| FR | 2693815 | 1/1994 |
| GB | 2388229 | 11/2003 |
| GB | 2438886 | 12/2007 |
| GB | 2444285 | 6/2008 |
| GB | 2449445 | 11/2008 |
| JP | H10255105 | 9/1998 |
| JP | 2000020468 | 1/2000 |
| JP | 2001337768 | 12/2001 |
| JP | 2009199581 | 9/2009 |

OTHER PUBLICATIONS

European Communication by the European Patent Office, European Patent Application No. 18192244.4, dated Feb. 5, 2019, pp. 1-7.

* cited by examiner

SYSTEMS AND METHODS FOR INCREASED SECURITY IN AUTHENTICATION CODE ENTRY FOR TOUCH-SENSITIVE SCREEN ENABLED DEVICES

RELATED APPLICATIONS

This application claims the benefit of U.S. Provisional Patent Application Ser. No. 62/466,416, filed Mar. 3, 2017, the disclosure of which is hereby incorporated, by reference, in its entirety.

BACKGROUND OF THE INVENTION

1. Field of the Invention

The present disclosure relates generally to systems and methods for increased security in authentication code entry for touch-sensitive screen enabled devices.

2. Description of the Related Art

With the advent of touch-sensitive screen technology, virtual keypads are often used for the entry of authentication codes, such as a PIN code. For example, physical number pads on devices such as Automated Teller Machines, payment terminals, and other point-of-sale device have been replaced by touch-sensitive screens. Because the touch-sensitive screens are touched with human fingers, fingerprints, touch marks, and other residue may remain on the touch-sensitive screen after being touched. Depending on how often the touch-sensitive screen is used, the fingerprints may be used by an unscrupulous individual to identify one or more digits in a PIN code, or to narrow down the possible digits in a PIN code significantly.

These and other deficiencies exist.

SUMMARY OF THE INVENTION

Systems and methods for increased security in authentication code entry for touch-sensitive screen enabled devices are disclosed. Exemplary embodiments may involve distorting or obfuscating existing fingerprints/touch marks on a touch-sensitive screen, adding additional fingerprints/touch marks to the touch-sensitive screen, or providing an interface by which fingerprints/touch marks may not have a discernable association with a virtual key location.

According to one embodiment, a method for enhanced security in entering data to a data entry device comprising at least one computer processor and a touch-sensitive screen may include: (1) the touch-sensitive screen displaying a touch instruction, the instruction indicating a touch location where a user touch is to be made on the touch-sensitive screen; (2) the touch-sensitive screen sensing a first touch; and (3) the at least one computer processor determining that the first touch is within a predetermined threshold of the touch location indicated by the touch instruction.

In one embodiment, the touch instruction instructs the user to traverse a portion of the touch-sensitive screen with the user touch; and the at least one computer processor determines that the first touch traverses the portion of the touch-sensitive screen indicated by the touch instruction within a predetermined threshold of the touch instruction.

In one embodiment, the at least one computer processor may determine that the sensed touch is continuous.

In one embodiment, the method may further include the at least one computer processor generating the touch instruction based on at least one previous touch sensed by the touch-sensitive screen.

In one embodiment, the touch-sensitive screen may display a virtual keypad comprising a plurality of virtual keys, and the at least one computer processor generates the touch instruction based on a number of virtual keys that will be traversed by the touch instruction.

In one embodiment, the touch instruction is a symbol displayed on the touch-sensitive screen.

In one embodiment, the method may further include the touch-sensitive screen displaying a second touch instruction indicating a second touch location where a user is to touch the touch-sensitive screen.

In one embodiment, the second touch instruction may be based on the first touch.

In one embodiment, the method may further include the touch-sensitive screen receiving an authentication code.

In one embodiment, data entry device may be a point of sale device.

In one embodiment, at least one of the processors may include a touch-sensitive screen controller.

According to another embodiment, a data entry device may include a touch-sensitive screen; a memory; and at least one computer processor. The touch-sensitive screen may display a touch instruction, the instruction indicating a touch location where a user touch is to be made on the touch-sensitive screen. The touch-sensitive screen may sense a first touch. The at least one computer processor may determine that the first touch is within a predetermined threshold of the touch location indicated by the touch instruction.

In one embodiment, the touch instruction may instruct the user to traverse a portion of the touch-sensitive screen with the user touch, and the at least one computer processor may determine that the first touch traverses the portion of the touch-sensitive screen indicated by the instruction within a predetermined threshold of the touch instruction.

In one embodiment, the at least one computer processor may determine that the sensed touch is continuous.

In one embodiment, the at least one computer processor may generate the touch instruction based on at least one previous touch sensed by the touch-sensitive screen.

In one embodiment, the touch-sensitive screen may display a virtual keypad comprising a plurality of virtual keys, and the at least one computer processor generates the touch instruction based on a number of virtual keys touched by the touch instruction.

In one embodiment, the touch instruction may include a symbol displayed on the touch-sensitive screen.

In one embodiment, the touch-sensitive screen may display a second touch instruction indicating a second touch location where a user is to touch the touch-sensitive screen.

In one embodiment, the second touch instruction may be based on the first touch.

In one embodiment, the touch-sensitive screen may receive an authentication code.

In one embodiment, the data entry device may include a point of sale device.

In one embodiment, at least one of the computer processors may include a touch-sensitive screen controller.

According to one embodiment, a method for enhanced security in entering data to a data entry device comprising at least one computer processor and a touch-sensitive screen may include (1) the touch-sensitive screen receiving an entry of an authentication code from a user; (2) the touch-sensitive screen displaying an instruction indicating a touch direction and a touch length in which the user is to touch the touch-sensitive screen; (3) the touch-sensitive screen sensing a touch comprising a sensed direction and a sensed length; and (4) the at least one computer processor determining that the sensed direction and sensed length are within a predetermined threshold of the touch direction and touch length, respectively.

In one embodiment, the method may further include the at least one computer processor determining that the sensed touch is continuous.

In one embodiment, the method may further include the at least one computer processor generating the instruction based on at least one previous touch sensed by the touch-sensitive screen.

In one embodiment, the touch-sensitive screen displays a virtual keypad comprising a plurality of virtual keys, and the at least one computer processor generates the instruction based on a number of virtual keys touched by the direction and length.

In one embodiment, the touch direction and touch length are based on a symbol displayed on the touch-sensitive screen.

In one embodiment, the method may further include the touch-sensitive screen displaying a second instruction indicating a second touch direction and a second touch length in which a user is to touch the touch-sensitive screen.

In one embodiment, at least one of the second touch direction and the second touch length are based on at least one of the sensed direction and the sensed length.

In one embodiment, the authentication code is received after the sensing of the touch.

According to another embodiment, a method for enhanced security in entering data to a data entry device comprising at least one computer processor and a touch-sensitive screen may include (1) the touch-sensitive screen receiving an entry of an authentication code from a user; (2) the touch-sensitive screen displaying a virtual keypad comprising a plurality of virtual keys; (3) the touch-sensitive screen displaying an instruction identifying a plurality of virtual keys at which the user is to touch the touch-sensitive screen; (4) the touch-sensitive screen sensing a plurality of touched virtual keys; and (5) the at least one computer processor determining that the plurality of touched virtual keys are the same as the virtual keys identified in the instruction.

In one embodiment, the method may further include the at least one computer processor generating the instruction based on at least one previous touch sensed by the touch-sensitive screen.

In one embodiment, the method may further include the touch-sensitive screen displaying a second instruction identifying a second plurality of virtual keys at which the user is to touch the touch-sensitive screen.

In one embodiment, at least one of the second plurality of virtual keys is selected based on at least one of the sensed touched virtual keys.

In one embodiment, the authentication code is received after the sensing of the plurality of touched virtual keys.

According to another embodiment, a method for enhanced security in entering data to a data entry device comprising at least one computer processor and a touch-sensitive screen may include (1) the touch-sensitive screen receiving an entry of an authentication code; (2) the at least one computer processor selecting a first virtual keypad comprising a plurality of virtual keys arranged in a first arrangement, the virtual keys comprising a first subset of virtual keys and a second subset of virtual keys; (3) the touch-sensitive screen displaying the first virtual keypad during an interaction with a first user; (4) the at least one computer processor selecting a second virtual keypad comprising the plurality of virtual keys arranged in a second arrangement, wherein the second arrangement is different from the first arrangement, and a position of first subset of virtual keys remains fixed relative to one another in the first arrangement and the second arrangement; and (5) the touch-sensitive screen displaying the second virtual keypad.

In one embodiment, the first subset of virtual keys comprises virtual keys associated with numbers 0, 1, 2, 3, 4, 5, 6, 7, 8, and 9.

In one embodiment, the first subset of virtual keys may be arranged in four rows, wherein the first row comprises virtual keys for the numbers 1, 2, and 3, the second row comprises virtual keys for the numbers 4, 5, and 6, the third row comprises virtual keys for the numbers 7, 8, and 9, and the fourth row comprises a virtual keys for the number 0.

In one embodiment, the first subset of virtual keys may be arranged in a circular manner, a rectangular manner, etc. In one embodiment, the first subset of digits associated with the virtual keys increase in value in a clockwise direction. In another embodiment, the first subset of digits associated with the virtual keys may increase in value in a counter-clockwise direction. In yet another embodiment, the virtual keys may be placed in a non-sequential order.

In one embodiment, the first subset of digits associated with the virtual keys may be arranged so that each digit's position relative to the other digits is maintained.

In one embodiment, the second subset of virtual keys comprises at least one of an enter virtual key, a delete virtual key, and a clear virtual key.

In one embodiment, the virtual keys in the first arrangement have a first size, and the virtual keys in the second arrangement have a second size.

According to another embodiment, a method for enhanced security in entering data to a data entry device comprising at least one computer processor and a touch-sensitive screen may include (1) the touch-sensitive screen displaying a graphical interface for receiving an authentication code, the graphical interface comprising a plurality of digits that are sequentially changeable; (2) the touch-sensitive screen sensing a first touch to change a first digit of the plurality of digits; (3) the at least one computer processor changing the first digit by sequentially changing the first digit in response to the first touch; (4) the touch sensitive screen displaying the changed first digit; (5) repeating the sensing of the first touch and changing of the first digit until the touch-sensitive screen senses a second touch accepting the first digit that is displayed; and (6) the at least one computer processor entering the first digit that is displayed as a first digit in the authentication code.

In one embodiment, the method may further include the touch-sensitive screen sensing a third touch to change a second digit of the plurality of digits; the at least one computer processor changing the second digit by sequentially changing the second digit in response to the third touch; the touch sensitive screen displaying the changed second digit; repeating the sensing of the third touch and changing of the second digit until the touch-sensitive screen senses a fourth touch accepting the second digit that is displayed; and the at least one computer processor entering the second digit that is displayed as a second digit in the authentication code.

In one embodiment, the at least one computer processor sequentially increases or decreases a value of the first digit in response to the first touch.

In one embodiment, the at least one computer processor sequentially increases or decreases a value of the second digit in response to the third touch.

In one embodiment, the first touch to change the first digit is sensed at a position at which the first digit is displayed on the touch-sensitive screen.

In one embodiment, the first touch to change the first digit is sensed at a first position adjacent to a position at which the first digit is displayed or at a second position adjacent to the position at which the first digit is displayed.

In one embodiment, the at least one computer processor increases the value of the first digit when the first touch is sensed at the first position, and decreases the value of the first digit when the first touch is sensed at the second position.

In one embodiment, the digit may be a number, a character, a symbol, etc.

According to another embodiment, a data entry device may include a touch-sensitive screen, a memory, and at least one computer processor. The touch-sensitive screen receives an entry of an authentication code from a user; the touch-sensitive screen displays an instruction indicating a touch direction and a touch length in which the user is to touch the touch-sensitive screen; the touch-sensitive screen senses a touch comprising a sensed direction and a sensed length; and the at least one computer processor determines that the sensed direction and sensed length are within a predetermined threshold of the touch direction and touch length, respectively.

According to one embodiment, the at least one computer processor determines that the sensed touch is continuous.

According to one embodiment, the at least one computer processor generates the instruction based on at least one previous touch sensed by the touch-sensitive screen.

According to one embodiment, the touch-sensitive screen displays a virtual keypad comprising a plurality of virtual keys; and the at least one computer processor generates the instruction based on a number of virtual keys touched by the direction and length.

According to one embodiment, the touch direction and touch length are based on a symbol displayed on the touch-sensitive screen.

According to one embodiment, the touch-sensitive screen displays a second instruction indicating a second touch direction and a second touch length in which a user is to touch the touch-sensitive screen.

According to one embodiment, at least one of the second touch direction and the second touch length are based on at least one of the sensed direction and the sensed length.

According to one embodiment, the authentication code is received after the sensing of the touch.

According to another embodiment, a data entry device may include a touch-sensitive screen, a memory, and at least one computer processor. The touch-sensitive screen receives an entry of an authentication code from a user; the touch-sensitive screen displays a virtual keypad comprising a plurality of virtual keys; the touch-sensitive screen displays an instruction identifying a plurality of virtual keys at which the user is to touch the touch-sensitive screen; the touch-sensitive screen senses a plurality of touched virtual keys; and the at least one computer processor determines that the plurality of touched virtual keys are the same as the virtual keys identified in the instruction.

According to one embodiment, the at least one computer processor generates the instruction based on at least one previous touch sensed by the touch-sensitive screen.

According to one embodiment, the touch-sensitive screen displays a second instruction identifying a second plurality of virtual keys at which the user is to touch the touch-sensitive screen.

According to one embodiment, at least one of the second plurality of virtual keys is selected based on at least one of the sensed touched virtual keys.

According to one embodiment, the authentication code is received after the sensing of the plurality of touched virtual keys.

According to another embodiment, a data entry device may include a touch-sensitive screen, a memory, and at least one computer processor. The touch-sensitive screen receives an entry of an authentication code; the at least one computer processor selects a first virtual keypad comprising a plurality of virtual keys arranged in a first arrangement, the virtual keys comprising a first subset of virtual keys and a second subset of virtual keys; the touch-sensitive screen displays the first virtual keypad during an interaction with a first user; the at least one computer processor selects a second virtual keypad comprising the plurality of virtual keys arranged in a second arrangement, wherein the second arrangement is different from the first arrangement, and a position of first subset of virtual keys remains fixed relative to one another in the first arrangement and the second arrangement; and the touch-sensitive screen displays the second virtual keypad.

According to one embodiment, the first subset of virtual keys comprises virtual keys associated with numbers 0, 1, 2, 3, 4, 5, 6, 7, 8, and 9.

According to one embodiment, the first subset of virtual keys are arranged in four rows, wherein the first row comprises virtual keys for the numbers 1, 2, and 3, the second row comprises virtual keys for the numbers 4, 5, and 6, the third row comprises virtual keys for the numbers 7, 8, and 9, and the fourth row comprises a virtual keys for the number 0.

According to one embodiment, the first subset of virtual keys may be arranged in a circular or rectangular manner, and may increase sequentially in a clockwise or counter-clockwise direction or may be in a non-sequential order.

According to one embodiment, the second subset of virtual keys comprises at least one of an enter virtual key, a delete virtual key, and a clear virtual key.

According to one embodiment, the virtual keys in the first arrangement have a first size, and the virtual keys in the second arrangement have a second size.

According to another embodiment, a data entry device may include a touch-sensitive screen, a memory, and at least one computer processor. The touch-sensitive screen displays a graphical interface for receiving an authentication code, the graphical interface comprising a plurality of digits that are sequentially changeable; the touch-sensitive screen senses a first touch to change a first digit of the plurality of digits; the at least one computer processor changes the first digit by sequentially changing the first digit in response to the first touch; the touch sensitive screen displays the changed first digit; the sensing of the first touch and changing of the first digit is repeated until the touch-sensitive screen senses a second touch accepting the first digit that is displayed; and the at least one computer processor enters the first digit that is displayed as a first digit in the authentication code.

According to one embodiment, the touch-sensitive screen senses a third touch to change a second digit of the plurality of digits; the at least one computer processor changes the second digit by sequentially changing the second digit in response to the third touch; the touch sensitive screen displays the changed second digit; the sensing of the third touch and changing of the second digit is repeated until the touch-sensitive screen senses a fourth touch accepting the second digit that is displayed; and the at least one computer processor enters the second digit that is displayed as a second digit in the authentication code.

According to one embodiment, the at least one computer processor sequentially increases or decreases a value of the first digit in response to the first touch.

According to one embodiment, the at least one computer processor sequentially increases or decreases a value of the second digit in response to the third touch.

According to one embodiment, the first touch to change the first digit is sensed at a position at which the first digit is displayed on the touch-sensitive screen.

According to one embodiment, the first touch to change the first digit is sensed at a first position adjacent to a position at which the first digit is displayed or at a second position adjacent to the position at which the first digit is displayed.

According to one embodiment, the at least one computer processor increases the value of the first digit when the first touch is sensed at the first position, and decreases the value of the first digit when the first touch is sensed at the second position.

According to one embodiment, the digit may be a number, a character, a symbol, etc.

According to another embodiment, a method for enhanced security in entering data to a data entry device comprising at least one computer processor and a touch-sensitive screen may include (1) the touch-sensitive screen displaying a graphical interface for receiving an authentication code, the graphical interface comprising a plurality of virtual keys, each virtual key associated with a digit, the virtual keys sequentially arranged in a rotary manner; (2) the touch-sensitive screen sensing a touch of one of the virtual keys; (3) the at least one computer processor sensing a movement of the touch; (4) the at least one computer processor sensing a release of the touch; (5) the at least one computer processor accepting the digit associated with the touched virtual key as a first digit in the authentication code.

In one embodiment, the at least one computer processor may sense a length, direction, and/or duration of the touch, and the digit associated with the touched virtual key may be accepted if the length and/or duration of the touch exceeds a threshold.

In one embodiment, the values on the virtual keys may increase in value in a counterclockwise direction. In another embodiment, the values on the virtual keys may increase in value in a clockwise direction. In another embodiment, the values on the virtual keys may be in a non-sequential order.

In one embodiment, the touch may traverse a plurality of virtual keys. In another embodiment, the virtual keys may rotate with the movement of the touch.

In one embodiment, the movement of the touch may be in a clockwise direction. In one embodiment, the movement of the touch may be in a counterclockwise direction.

In one embodiment, the arrangement of the virtual keys may change with each touch. For example, arrangement of the values on the virtual keys may change so that it is different. In one embodiment, the values on the virtual keys may maintain a sequential relationship.

In another embodiment, the arrangement of the virtual keys may change with each interaction. In still another embodiment, the arrangement of the virtual keys may change periodically.

According to another embodiment, a data entry device may include a touch-sensitive screen, a memory, and at least one computer processor. The touch-sensitive screen displays a graphical interface for receiving an authentication code, the graphical interface may include a plurality of virtual keys, each virtual key associated with a digit, the virtual keys arranged in a rotary manner. The touch-sensitive screen may sense a touch of one of the virtual keys, a movement of the touch, and a release of the touch. The at least one computer processor may accept the digit associated with the touched virtual key as a first digit in the authentication code.

In one embodiment, the at least one computer processor may sense a length and/or duration of the touch, and the digit associated with the touched virtual key may be accepted if the length and/or duration of the touch exceeds a threshold.

In one embodiment, the values on the virtual keys may increase in value in a counterclockwise direction. In another embodiment, the values on the virtual keys may increase in value in a clockwise direction. In another embodiment, the values on the virtual keys may be in a non-sequential order.

In one embodiment, the display of the virtual keys may rotate with the movement of the touch.

In one embodiment, the movement of the touch may be in a clockwise direction. In one embodiment, the movement of the touch may be in a counterclockwise direction.

In one embodiment, the digit may be a number, a character, a symbol, etc.

According to embodiments, the disclosed data entry device may be a point of sale device.

According to embodiments, one of the computer processors may be a touch-sensitive screen controller.

These and other embodiments and advantages will become apparent from the following detailed description, taken in conjunction with the accompanying drawings, illustrating by way of example the principles of the various exemplary embodiments.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Various embodiments of the present invention and their advantages may be understood by referring to FIGS. 1-15.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Embodiments are directed to increasing security in authentication code entry for touch-sensitive screen enabled devices. In one embodiment, this may involve distorting or obfuscating existing fingerprints/touch marks on a touch-sensitive screen. In another embodiment, this may involve adding additional fingerprints and/or touch marks to the touch-sensitive screen. In still another embodiment, a graphical interface in which fingerprints/touch marks may not have a discernable association with a virtual key may be provided.

Although embodiments may be disclosed in the context of the entry of an authentication code, such as a number-based PIN, it should be recognized that the entry of any authentication code, including letters, numbers, symbols, gestures, etc. is also contemplated and within the scope of this disclosure, and the use of the term PIN should be recognized to encompass more than a code consisting of numbers or a particular number of digits or characters.

Figure 1:
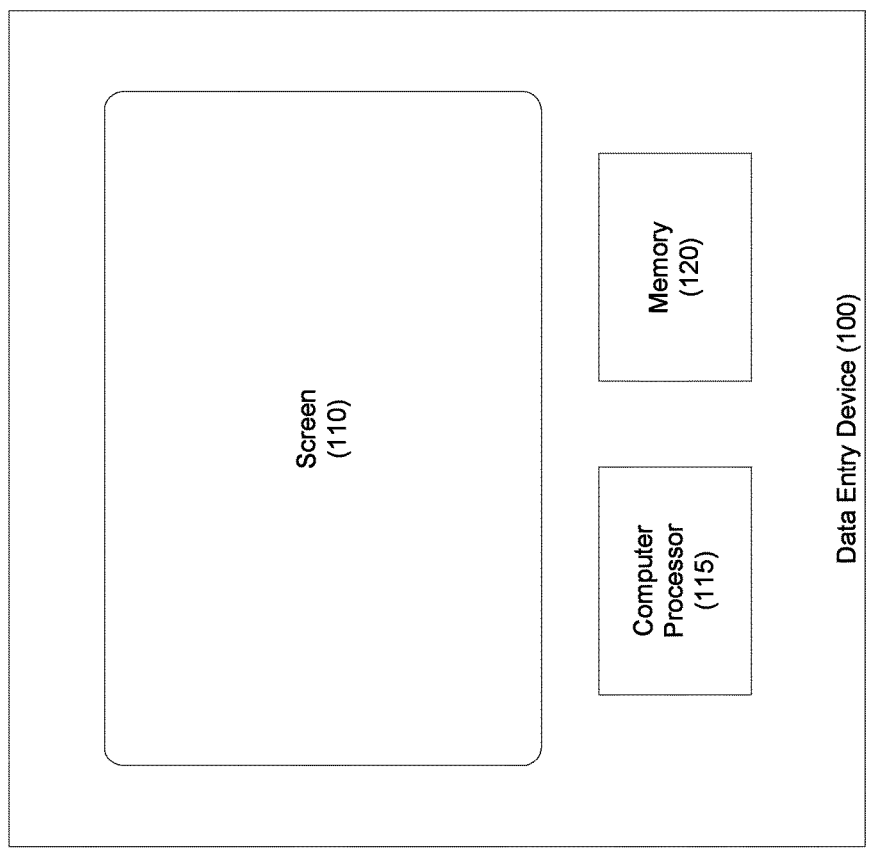
FIG. 1 depicts a system for increased security in authentication code entry for touch-sensitive screen enabled devices according to exemplary embodiments.

Referring to FIG. 1, a touch-sensitive screen data entry device is disclosed according to one embodiment. Data entry device 100 may include screen 110, computer processor 115, and memory 120. Data entry device 100 may interface with at least one network (not shown), such as communication networks, payment networks, etc. Other peripherals (e.g., input devices, output devices, cameras, displays, headphone jacks, Bluetooth interfaces, etc.) may be provided as necessary and/or desired.

In one embodiment, data entry device 110 may be a point of sale (POS) device.

In one embodiment, computer processor 115 may be any suitable processing machine that executes the instructions that may be stored in internal and/or external memory or memories to process data. It may include general purpose computer processors, specialized computer processors, integrated circuits, programmed microprocessors, micro-controllers, peripheral integrated circuit elements, a CSIC (Customer Specific Integrated Circuit), ASIC (Application Specific Integrated Circuit), other integrated circuits, digital signal processors, programmable logic devices such as a FPGA, PLD, PLA or PAL, or any other suitable device or arrangement of devices.

In one embodiment, screen 110 may be a touch-sensitive screen device, and may be sensitive to a single touch, or to multiple simultaneous, or near simultaneous, touches. In one embodiment, screen 110 may provide a user with tactile feedback, such as haptic feedback. Feedback may be provided in response to the user touching screen 110, in response to a user touching a virtual key on screen 110, etc.

In one embodiment, screen 110 may include a microcontroller or other controller that may sense and process touches and release of touches to the surface of screen 110. In one embodiment, as used herein, computer processor 115 may refer to such a microcontroller or processor. Further the functionality of sensing and processing touches and release of touches may be divided between a microcontroller (or other controller) and computer processor 110.

In embodiments, processing on data sensed by screen 110 may be performed by computer processor 115 and/or a computer processor, controller, microcontroller, etc. that may control the operation of screen 110.

Figure 2:
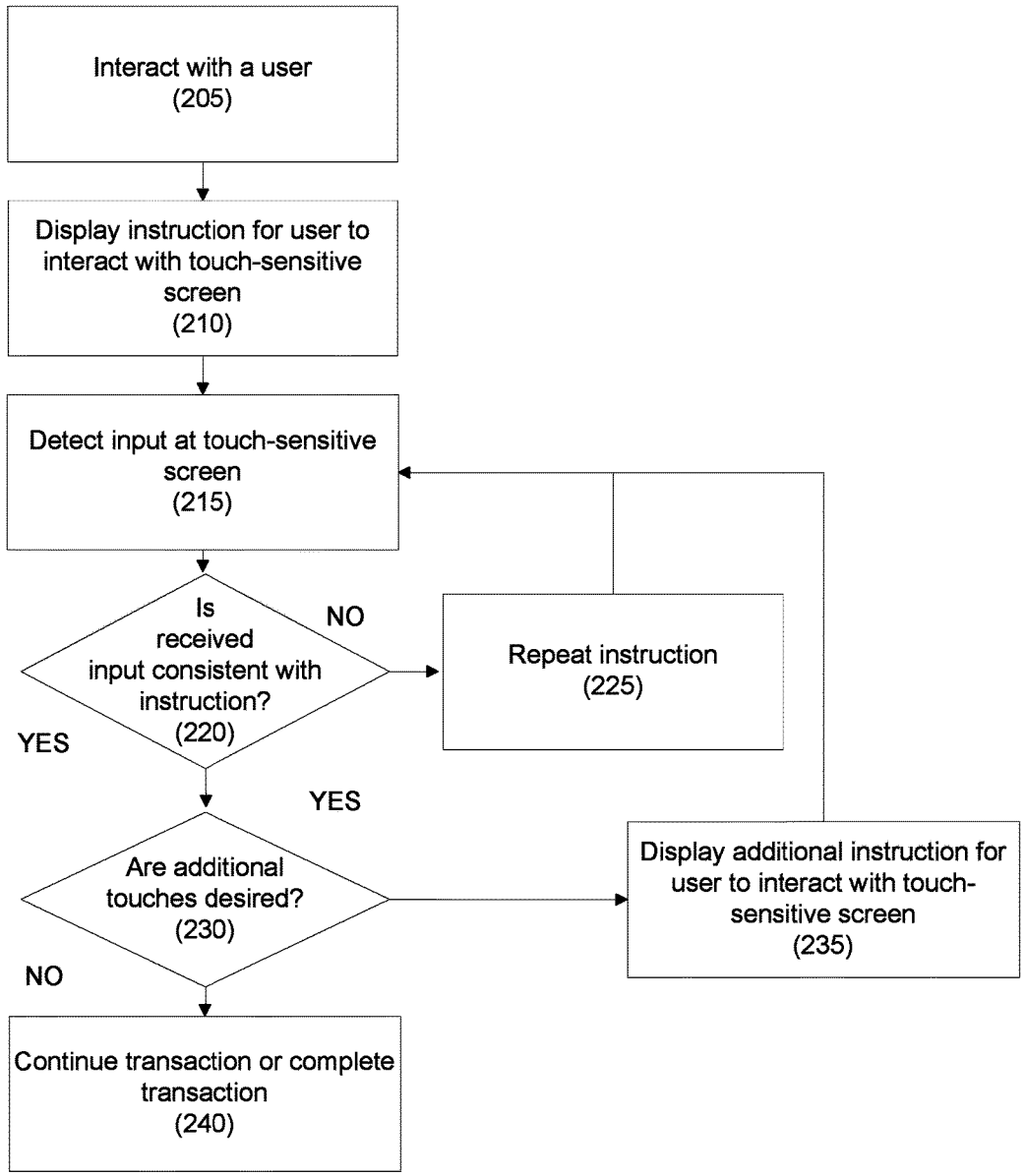
FIG. 2 depicts a method for increased security in authentication code entry for touch-sensitive screen enabled devices according to one embodiment.

Referring to FIG. 2, a method for increasing security in authentication code entry for touch-sensitive screen enabled devices is disclosed according to one embodiment.

In step 205, a user may interact with a touch-sensitive screen enabled device that may require entry of an authentication code (e.g., a personal identification entry) using a virtual keypad comprising a plurality of virtual keys. Although this embodiment may be disclosed in the context of the entry of one or more digits of an authentication code using virtual keys, it should be recognized that the digits may be an entry of numbers, characters, symbols, combinations, etc. as necessary and/or desired.

In step 210, the touch-sensitive screen may display an instruction for the user to interact with the touch-sensitive screen that will distort or obfuscate existing fingerprints/touch marks on the touch-sensitive screen, or will add additional fingerprints and/or touch marks to the touch-sensitive screen. In one embodiment, the instruction may be a textual and/or graphic instruction, and may illustrate a manner in which to interact with the screen. For example, an instruction may be provided for the user to touch the screen and swipe over an area of the screen. In doing so, this additional touch may serve to distort or obfuscate any fingerprints/touch marks that may have previously been present on the touch-sensitive screen. The instruction may also be for the user to use one or more fingers, or in some instances the entire hand or palm, to touch the screen in the swiping motion. In another embodiment, the instruction may be provided to make additional touches on the touch-sensitive screen so that the user adds additional fingerprints/touch marks to the touch-sensitive screen so it is more difficult to determine the virtual key or keys that were recently selected. The instruction of step 210 may be provided before or after the user has entered an authentication code (i.e., before the user has put fingerprints or touch marks on the screen or after the user has put fingerprints or touch marks on the screen). In the case of an instruction to touch and swipe the screen, it is preferable that the instruction is provided after the user has entered an authentication code so that the user's fingerprints/touch marks may be distorted or obfuscated, or that additional fingerprints/touch marks may be added.

In another embodiment, the instruction for the user to interact with the touch-sensitive screen may be provided in a non-graphical manner, such as by an audio instruction. In one embodiment, a user may be given the option of receiving audio instructions, in place of, or in addition to, the display of visual instructions.

In one embodiment, the instruction may be based on recent screen touches so as to cause the user to touch areas of the touch-sensitive screen that were recently touched by other users to distort or obfuscate any fingerprints/touch marks in those areas of the touch-sensitive screen. For example, the instruction may involve touching or swiping over a random subset (e.g., three) of the virtual keys touched by the past ten customers. Any suitable way of identifying virtual keys to touch may be used as is necessary and/or desired. Alternatively, the user may be instructed by onscreen prompts to touch areas of the touch-sensitive screen that were not recently touched in order to add additional fingerprints/touch marks to the screen to increase the difficulty of discerning meaningful fingerprints/touch marks or to otherwise use the fingerprints/touch marks to determine a user's authentication code.

In another embodiment, the instruction may be random. In another embodiment, a series of instructions may be provided. In each case, the instructions cause the user to touch the screen in a manner that obfuscates, distorts, adds, or otherwise masks touch marks on the screen left by a user when entering an authentication code.

Figure 3A:
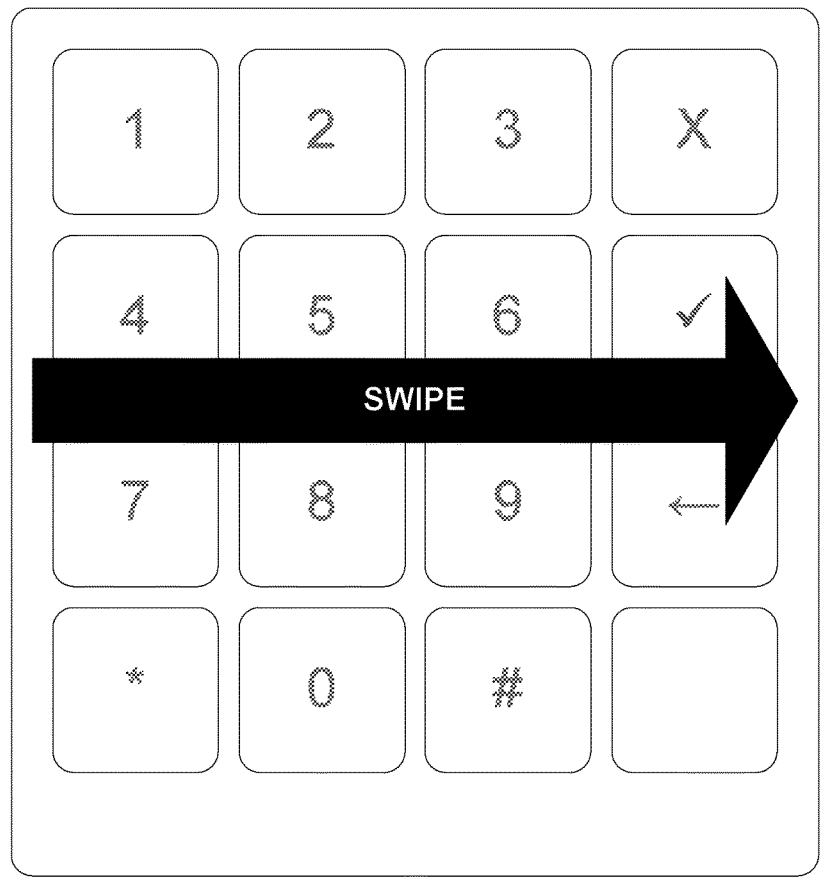
FIGS. 3A and 3B depict exemplary instruction screens according to embodiments.
Figure 3B:
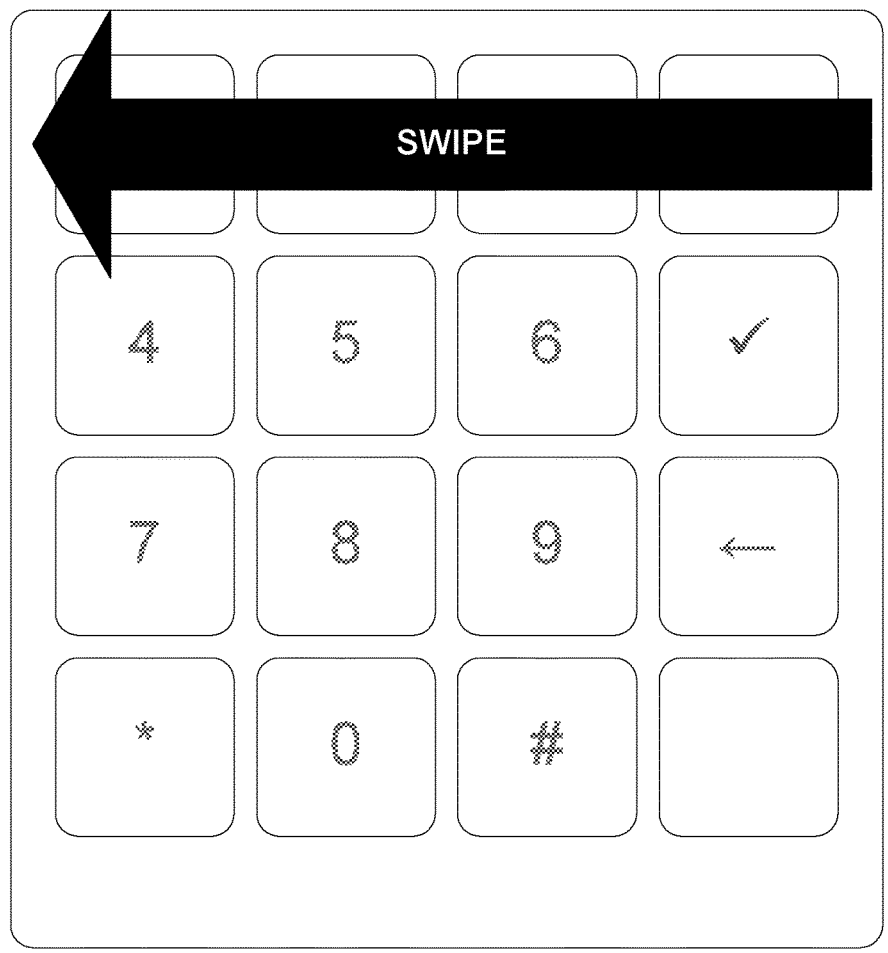
Figure 4:
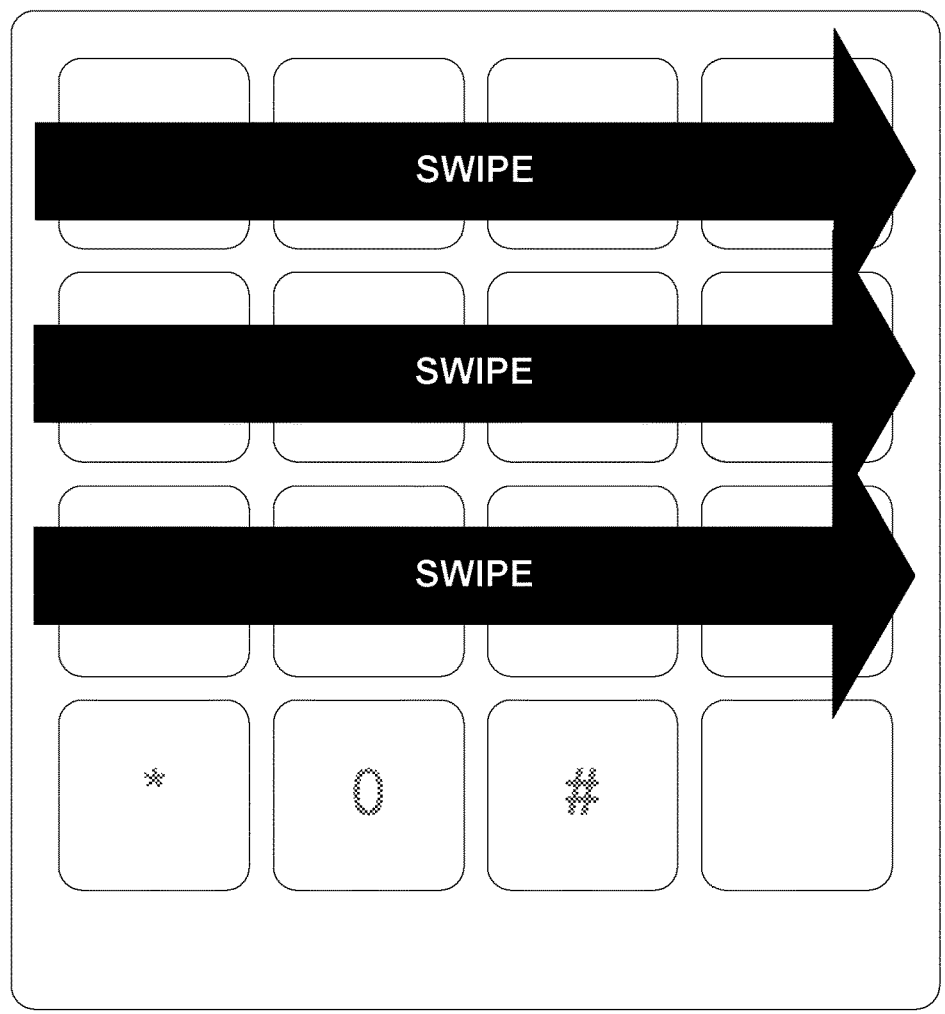
FIG. 4 depicts an exemplary instruction screen according to another embodiment.
Figure 5:
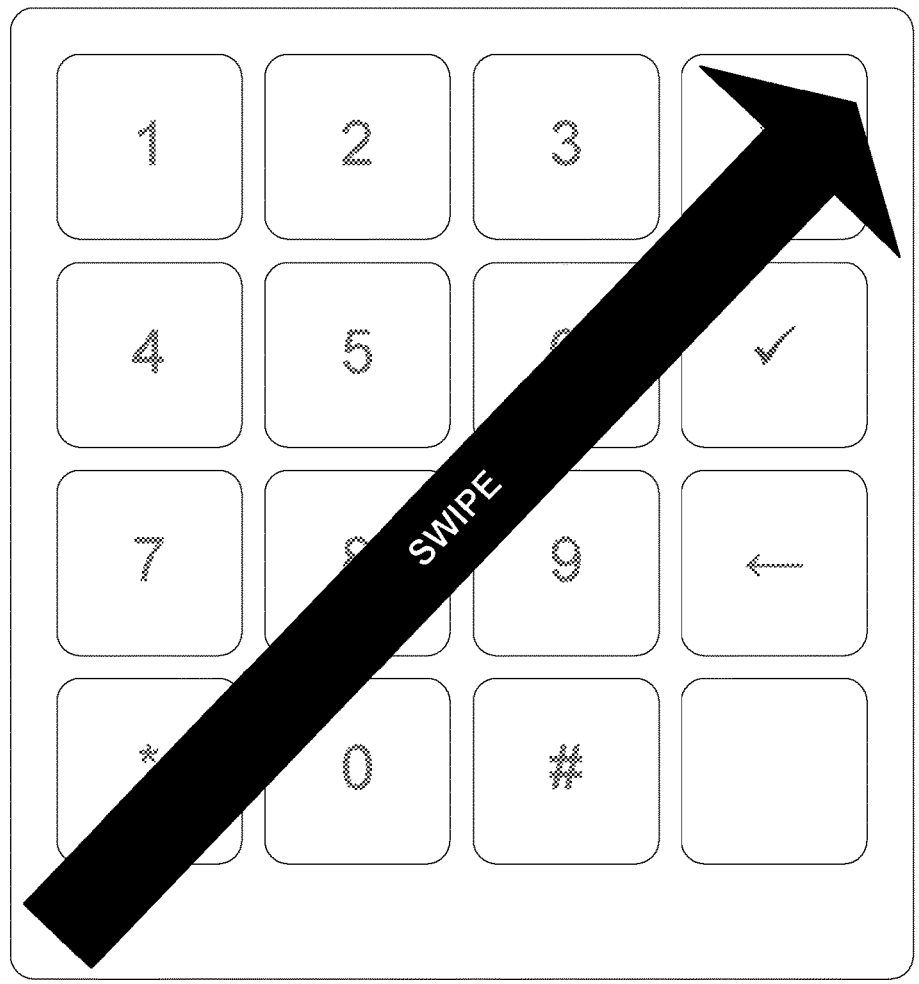
FIG. 5 depicts an exemplary instruction screen according to another embodiment.

In one embodiment, the instruction may identify a touch direction and a touch length for the user to touch the screen. For example, FIGS. 3-5 depict exemplary screenshots of instructions that instruct the user to swipe the screen from left to right (e.g., FIG. 3A), right to left, (e.g., FIG. 3B), etc. in the direction of the arrow. As another example, the instruction may instruct the user to make a number of simultaneous, or near-simultaneous, touches on the screen (e.g., FIG. 4). The instruction may comprise an arrow in any direction, a crooked line, a symbol to trace, etc. Any suitable instruction may be provided as is necessary and/or desired.

Figure 6:
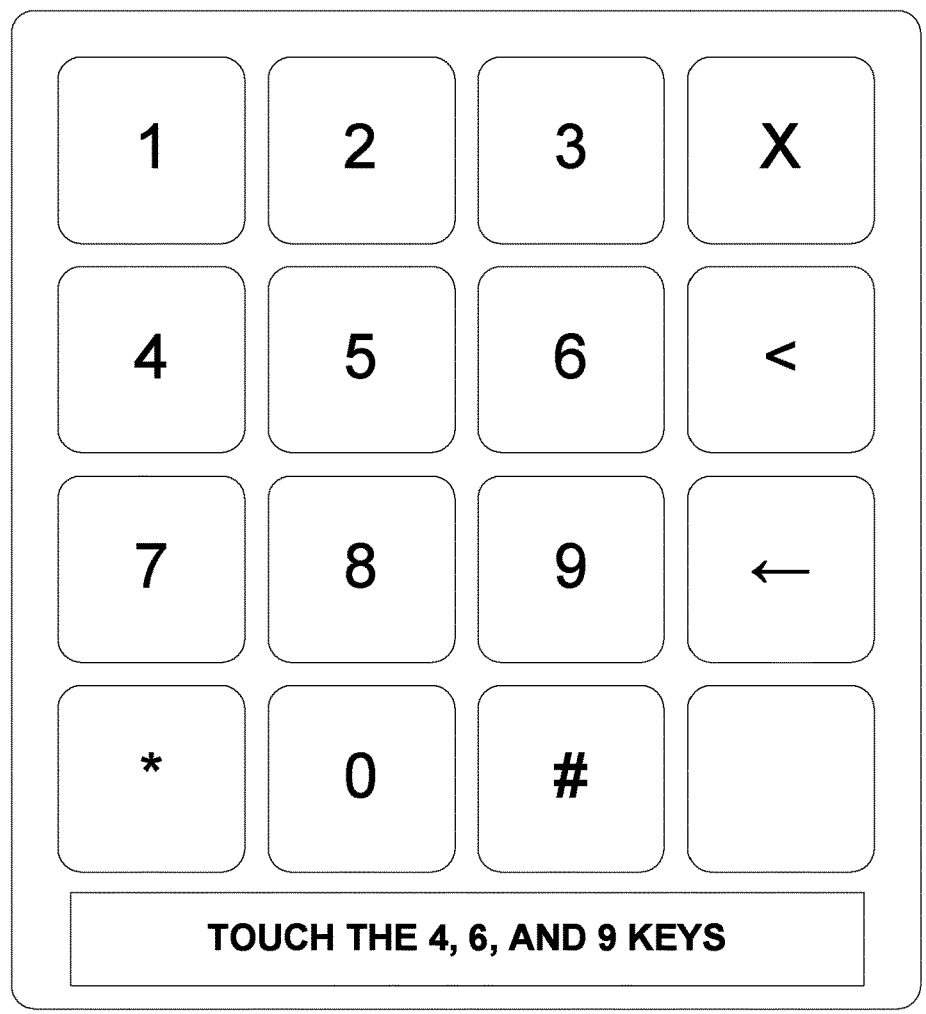
FIG. 6 depicts an exemplary instruction screen according to another embodiment.

In one embodiment, the instruction may identify a number of points or virtual keys on the touch-sensitive screen for the user to touch or traverse (e.g., swipe over with a continuous touch). For example, FIG. 6 depicts an exemplary screenshot in which the user is instructed to touch certain virtual keys, thereby adding fingerprints/touch marks to the touch-sensitive screen. Although FIG. 6 depicts an instruction for the user to touch three virtual keys, the user may be instructed to touch any suitable number of virtual keys. In one embodiment, the instruction may identify the virtual keys to touch by providing graphical images, similar to the manner in which symbols in CAPTCHA programs are provided. In one embodiment, the keys to be touched may be highlighted in any suitable manner to indicate which keys the user is to touch, including by highlighting keys one at a time in a sequence, or by highlighting all keys that are to be touched simultaneously.

In another embodiment, a second virtual keypad with different virtual keys may be displayed in place of the virtual numeric keypad, and the instruction may instruct the user to touch virtual keys on that virtual keypad. For example, if the first virtual keypad is a numeric keypad, the second virtual keypad may include virtual keys with letters, symbols, graphics, etc. In one embodiment, they layout of the virtual keys on the second virtual keypad may have no relation to the layout of the virtual keys on the first virtual keypad.

Figure 7:
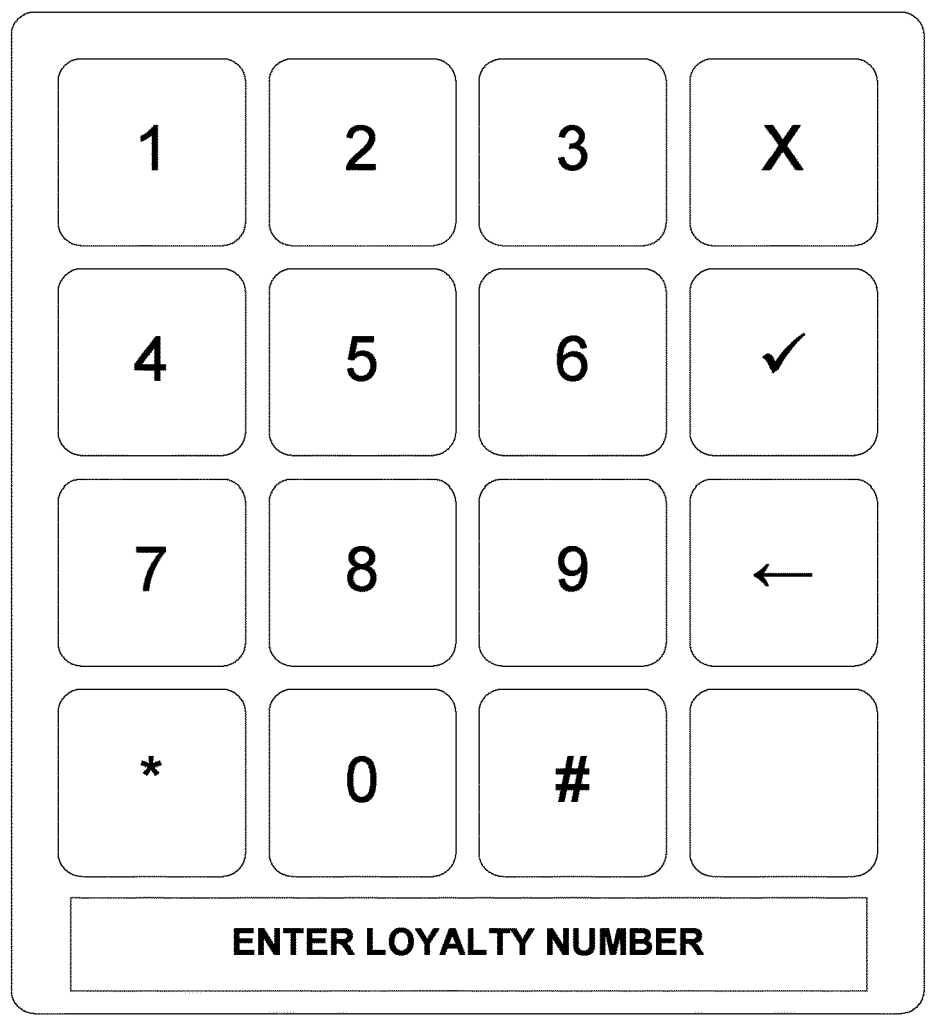
FIG. 7 depicts an exemplary instruction screen according to another embodiment.

In another embodiment, the user may be prompted to touch the screen to enter an identifier, such as a loyalty number, phone number, zip code, etc. FIG. 7 depicts an example in which a user may be asked to enter a loyalty number.

Other instructions, such as leaving feedback (e.g., "Please rate this system from 0-9"), playing a game (e.g., trivia that requires a touch-based entry, a game that receives interaction through swipes), tracing an image (e.g., corporate logos), etc. may be used as is necessary and/or desired.

In step 215, the user's input is detected, and, in step 220, the user's input may be compared to the instruction. For example, in one embodiment, the touch-sensitive screen may sense a touch or multiple touches having a direction and a length. In another embodiment, the touch-sensitive screen may sense one or more touches at one or more virtual keys, or points, on the touch-sensitive screen.

If the input is not consistent with the instruction (e.g., the user did not touch or swipe sufficient keys), in step 225, the instruction may be repeated, or a new instruction may be provided.

For example, in one embodiment, the computer processor may determine whether the direction of the touch and/or the length of the touch is within a certain threshold of the direction and length provided in the instruction. It may also determine whether the touch was continuous or discontinuous.

In another embodiment, the computer processor may determine whether the points that the user has touched are within a certain distance of the instruction.

In another embodiment, the computer processor may determine whether the virtual keys that the user has touched or traversed are the same as the virtual keys identified in the instruction.

In one embodiment, the instruction may be displayed until the user provides an input that sufficiently complies with the instruction. In another embodiment, the instruction may be displayed until the system determines that the user has sufficiently touched the screen to obfuscate or distort prior fingerprints/touch marks, or has added a sufficient number of fingerprints/touch marks.

In step 230, if additional touches are desired (e.g., the previous touch or touches were insufficient to obfuscate or distort fingerprints/touch marks on the touch-sensitive screen, or an insufficient number of fingerprints/touch marks have been added), in step 235, at least one additional instruction may be provided. In one embodiment, the additional instruction may be a different instruction type from the prior instruction (e.g., if the previous instruction was a swipe, the next instruction may be a fingerprint-generating instruction). In another embodiment, the instruction may be the same as the previous instruction, but may touch a different area of the touch-sensitive screen. In still another embodiment, the instruction may be random and unrelated to the previous instruction.

If additional touches are not desired, in step 240, the interaction may be continued or may be completed.

In one embodiment, the entry of the authentication code may occur after the receipt of the touches based on the instructions as described in the embodiments.

Figure 8:
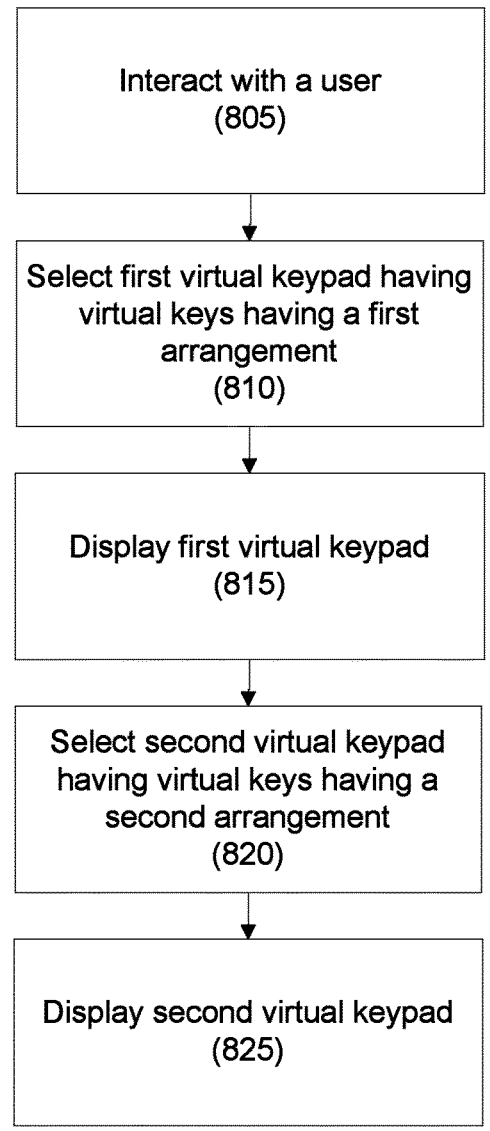
FIG. 8 depicts a method for increased security in authentication code entry for touch-sensitive screen enabled devices according to another embodiment.

Referring to FIG. 8, a method for increasing security in authentication code entry for touch-sensitive screen enabled devices is disclosed according to another embodiment.

In step 805, a user may interact with a touch-sensitive screen enabled device that may require entry of an authentication code (e.g., a PIN) using a virtual keypad comprising a plurality of virtual keys. Although this embodiment may be disclosed in the context of the entry of one or more digits of an authentication code using virtual keys, it should be recognized that the digits may be an entry of numbers, characters, symbols, combinations, etc. as necessary and/or desired.

In step 810, the device may select a first virtual keypad for interacting with the user. In one embodiment, the first virtual keypad may include virtual keys having a first arrangement. For example, the virtual keypad may include a numeric virtual keys (i.e., 0-9) and non-numeric virtual keys (e.g., cancel, *, #, delete, enter, etc.). In one embodiment, the numeric virtual keys may have a fixed position relative to one another (e.g., a top row including 1, 2, and 3; a second row including 4,5, and 6; a third row including 7, 8, and 9; and a bottom row that includes the number 0 and one or two additional keys), while the position of the non-numeric keys may vary. In one embodiment, the virtual key(s) to the right and/or left of the 0 virtual key may also vary. For example, the non-numeric virtual keys may be presented in a row above the numeric virtual keypad portion, below the numeric virtual keypad portion, to the right of the numeric virtual keypad portion, or to the left of the numeric virtual keypad portion. By changing the position of the non-numeric virtual keys relative to the numeric virtual keys, the position of the screen of the numeric virtual keypad portion will vary, thereby reducing or eliminating any association between the location of a fingerprint or touch mark on the touch-sensitive screen and a value of a virtual key touched when such fingerprint or touch mark was made.

FIGS. 9A-9D illustrate several exemplary arrangements of virtual keypads according to embodiments. Other arrangements and orientations may be used as is necessary and/or desired.

Figure 9A:
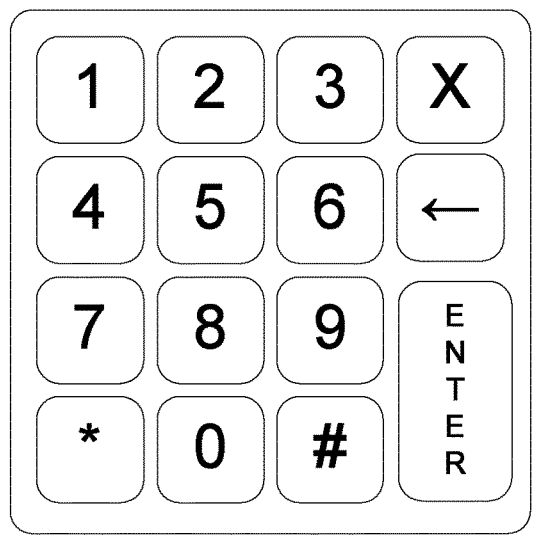
FIG. 9A depicts an exemplary virtual keypad arrangement according to one embodiment.
Figure 9B:
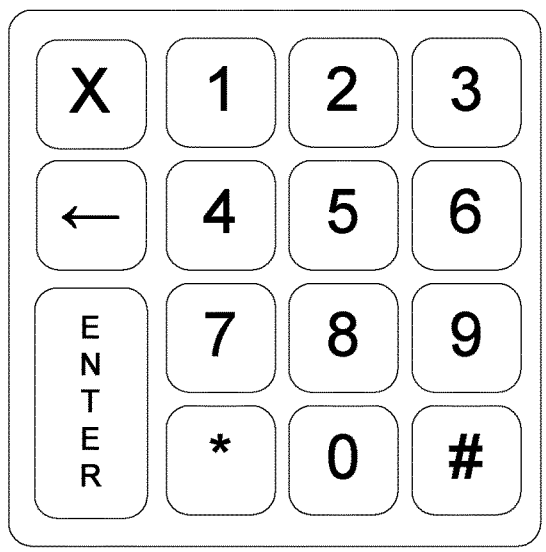
FIG. 9B depicts an exemplary virtual keypad arrangement according to another embodiment.
Figure 9C:
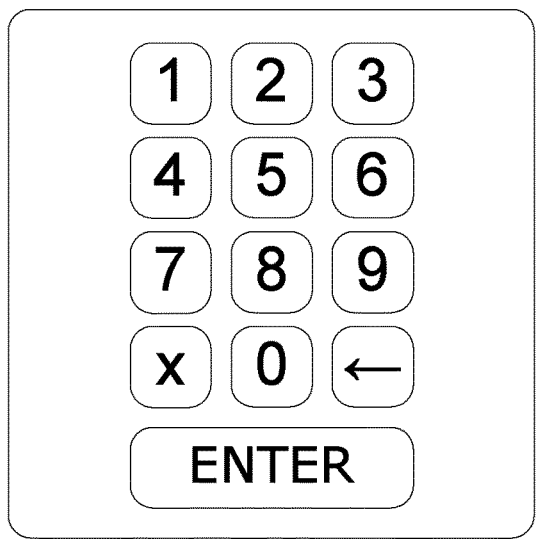
FIG. 9C depicts an exemplary virtual keypad arrangement according to another embodiment.
Figure 9D:
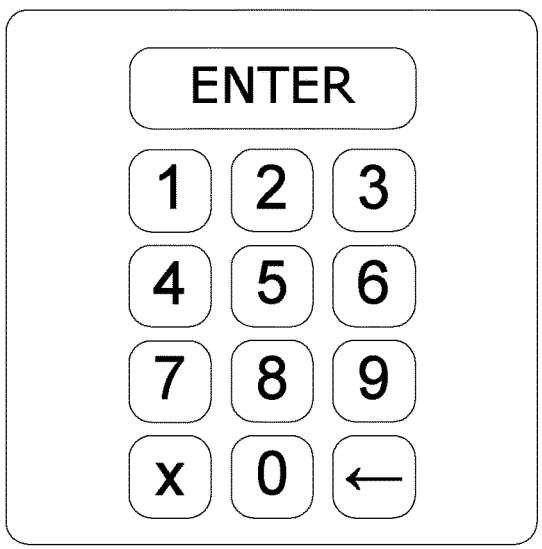
FIG. 9D depicts an exemplary virtual keypad arrangement according to another embodiment.
Figure 9E:
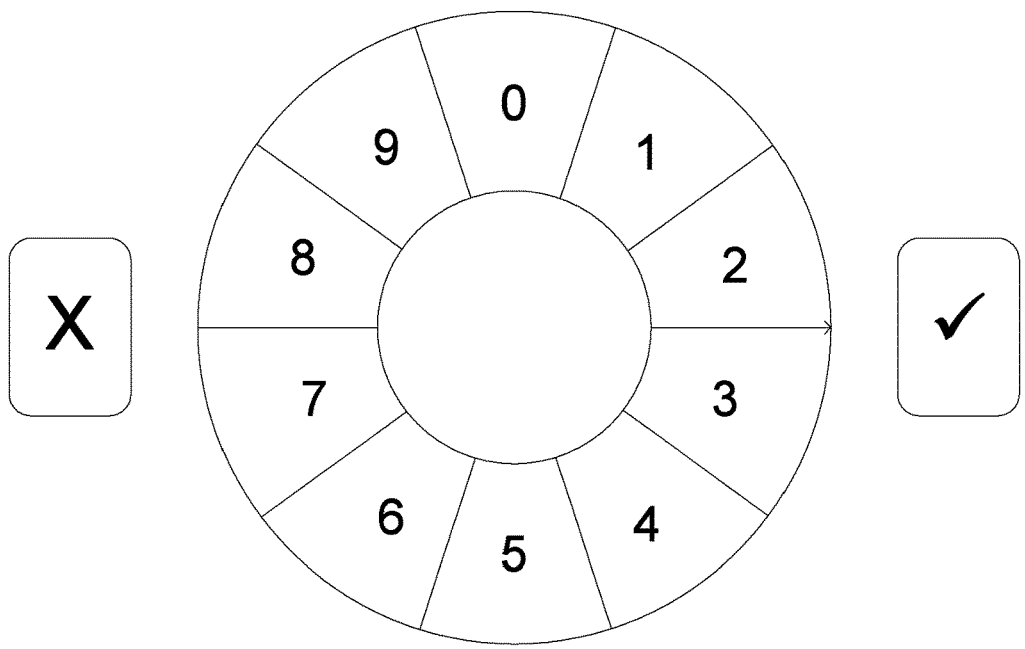
FIG. 9E depicts an exemplary virtual keypad arrangement according to another embodiment.
Figure 9F:
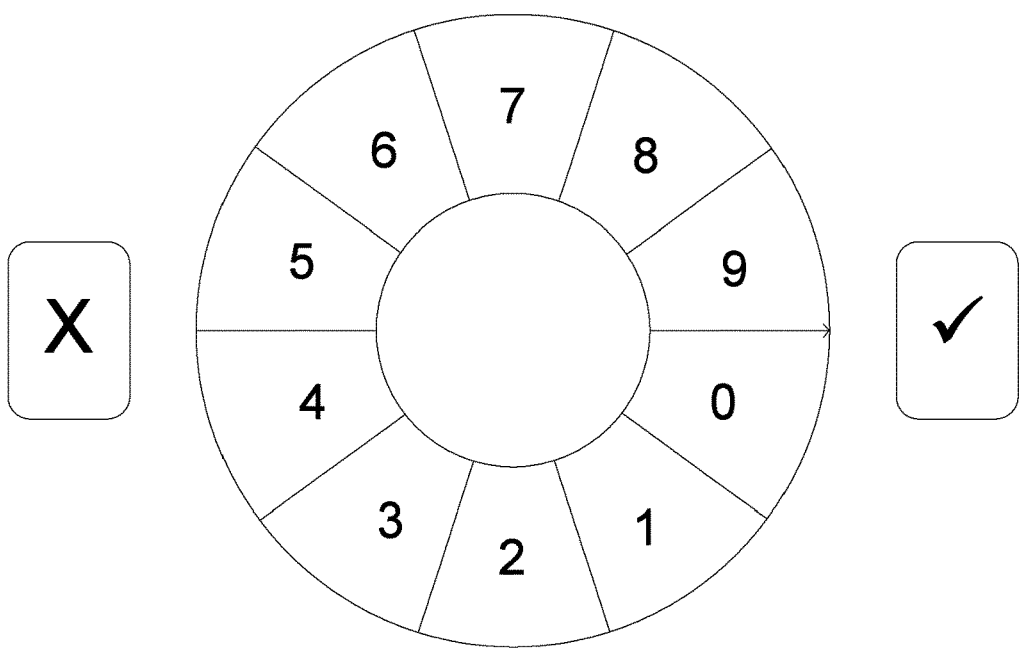
FIG. 9F depicts an exemplary virtual keypad arrangement according to another embodiment.
Figure 9G:
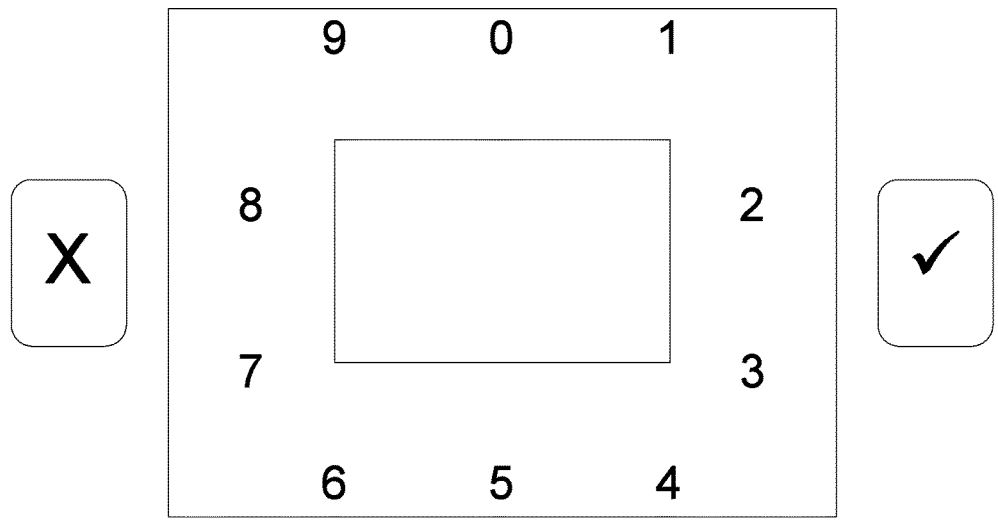
FIG. 9G depicts an exemplary virtual keypad arrangement according to another embodiment.
Figure 9H:
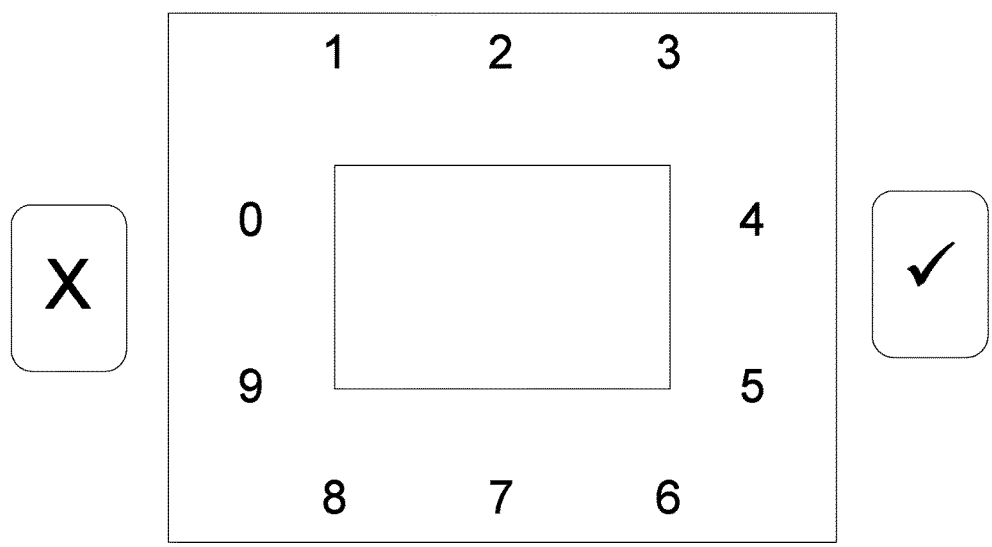
FIG. 9H depicts an exemplary virtual keypad arrangement according to another embodiment.

FIGS. 9E, 9F, 9G, and 9H illustrate exemplary arrangements of virtual keypads according to embodiments. In FIGS. 9E and 9F, the virtual keys are arranged in a circular manner, while in FIGS. 9G and 9H, the virtual keys are arranged in a rectangular manner. Any suitable geometry may be used as is necessary and/or desired.

In embodiments, the boundaries between virtual keys may be visually displayed, such as in FIGS. 9E and 9F. In other embodiments, the boundaries between keys may not be visually depicted, such as in FIGS. 9G and 9H. It will be appreciated by one of skill in the art that the visual representation, or lack of representation, of such boundaries is not dependent on any particular geometrical arrangement of the virtual keys or shape of the virtual keys. For example, the virtual keys of FIGS. 9E-9F could be displayed without such boundaries, and FIGS. 9G-9H could be displayed with such boundaries).

In one embodiment, the digits associated with the virtual keys may be arranged so that each digit's position relative to the other digits is maintained. For example, the digits may sequentially increase in value in a clockwise direction from 0-9, as illustrated in FIGS. 9E, 9F, 9G, and 9H With each touch, or after entry of a complete authentication code, however, the position of the digits may change, while the sequential relationship is maintained. Thus, the "0" digit will be followed by the "1" digit, which will be followed by the "2" digit, etc. as one moves in the clockwise direction regardless of where the digits are positioned. Thus, any association between the location of a fingerprint or touch mark on the touch-sensitive screen and a value of a virtual key touched when such fingerprint or touch mark was made may be reduced or eliminated.

In another embodiment, the digits may sequentially increase in value in a counterclockwise direction.

In another embodiment, the digits may be placed in a non-sequential order.

In another embodiment, instead of, or in addition to, digits, alphanumeric characters, symbols, or images may be used with or without a fixed sequence.

In one embodiment, a "cancel" and an "enter" virtual key may be provided. Although these virtual keys are illustrated as being to the left and right of the digits in FIGS. 9E-9G, it should be recognized that these virtual keys may be positioned at any suitable location (e.g., above/below, on the same side, within the space at the center of the digits, etc.), at the beginning/end/middle of the sequence of digits, or may not be provided at all.

Referring again to FIG. 8, in step 815, the first virtual keypad may be displayed for interaction with a first user. In one embodiment, the first virtual keypad may have virtual keys having a first arrangement.

In step 820, the device may select a second virtual keypad that may include virtual keys having a second arrangement. In one embodiment, the second virtual keypad may be selected after the interaction with the first user is complete, so that the first user interacts with the same virtual keypad for the entire interaction and a second user interacts with a different virtual keypad for an entire second interaction; in another embodiment, the second virtual keypad may be selected during the interaction with the first user should a second virtual keypad be necessary. Other timings for the selection of the second virtual keypad may be used as is necessary and/or desired.

In one embodiment, the positions of a first subset of the virtual keys may be fixed relative to one another, while the positions of a subset of the virtual keys may vary with respect to each other and the first subset of virtual keys. For example, if a virtual numeric keypad virtual keypad is used, the positions of the numeric virtual keys may remain fixed relative to one another, while the positions of the non-numeric virtual keys may vary. As another example, if a sequential-type virtual keypad is used (e.g., FIGS. 9E-9H), the virtual keys may maintain a sequential relationship with either other in a clockwise or counterclockwise direction.

In one embodiment, the second arrangement may be selected randomly. In another embodiment, the second arrangement may be prevented from being the same as the first arrangement. In another embodiment, the device may cycle sequentially, randomly, or pseudo-randomly among a plurality of arrangements (e.g., in one embodiment using a numeric virtual keypad, there may be a first arrangement with the non-numeric keys to the left of the numeric virtual keys; a second arrangement with the non-numeric keys to the right of the numeric virtual keys; a third arrangement with the non-numeric keys above the numeric virtual keys; and a fourth arrangement with the non-numeric keys below the numeric virtual keys). As another example, a first arrangement may have the "0" digit at the top (e.g., the 12 o'clock position) of the interface, a second arrangement may have the "0" key at the right side (e.g., the 3 o'clock position) of the interface, a third arrangement may have the "0" key at the bottom (e.g., the 6 o'clock position) of the interface, and a fourth arrangement may have the "0" key on the left side (e.g., the 9 o'clock position) of the interface. Any other suitable placement may be used as is necessary and/or desired. In another embodiment, the device may repeat use of a numeric keypad arrangement for a certain number of times before identifying a different numeric keypad arrangement to display and use.

Other manners for identifying and/or determining the arrangement of the second virtual keypad may be used as is necessary and/or desired.

In step 825, the second virtual keypad may be displayed.

In one embodiment, in addition, or instead, the size of the virtual keys may vary as well. For example, the numeric virtual keys may have a first size, and the non-numeric virtual keys may have a second size. By varying the size of the virtual keys, the position of the numeric virtual keypad portion will vary, thereby reducing or eliminating any association between a fingerprint or touch mark on the touch-sensitive screen and a particular virtual key. In one embodiment, although the sizes of the virtual keys may change, the ratios of the numeric virtual keys may remain consistent.

In one embodiment, the area occupied by the virtual keypad may remain the same. This may increase obfuscation as any additional fingerprints or touch marks will be added to the same area.

In one embodiment, additional touch instructions, such as those discussed with reference to FIGS. 3-7, may be provided as is necessary and/or desired.

Figure 10:
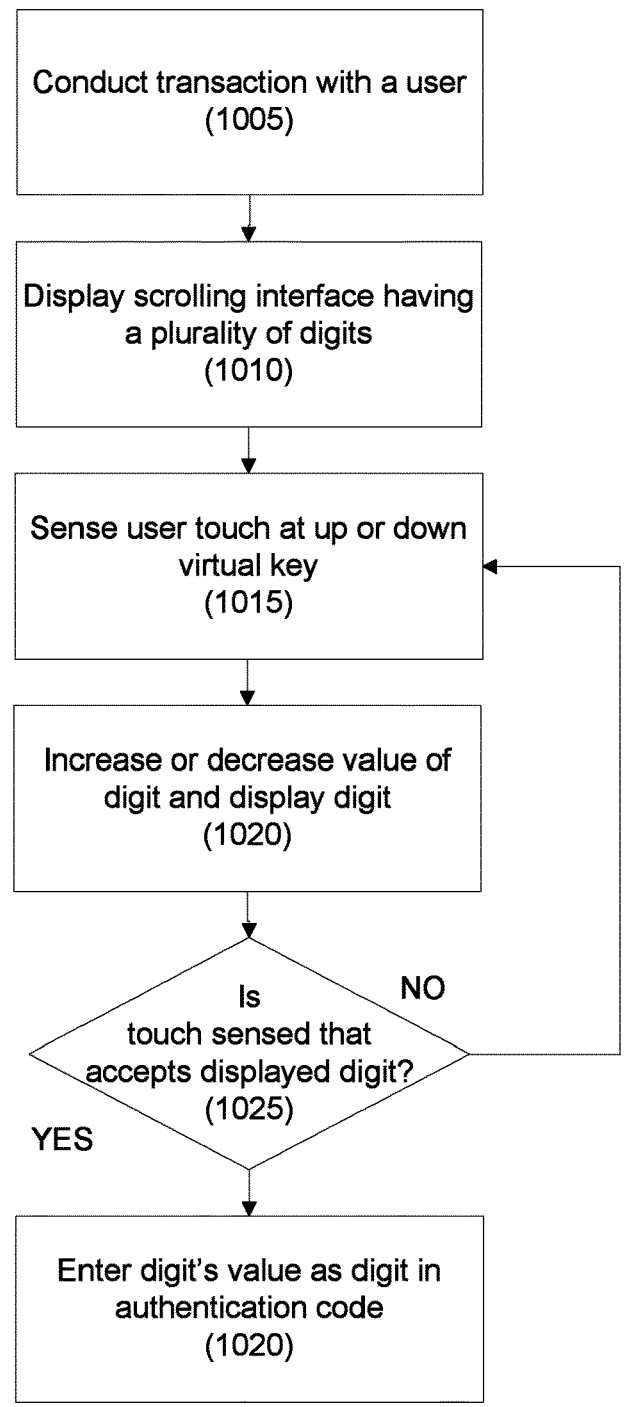
FIG. 10 depicts a method for increased security in authentication code entry for touch-sensitive screen enabled devices according to another embodiment.
Figure 11:
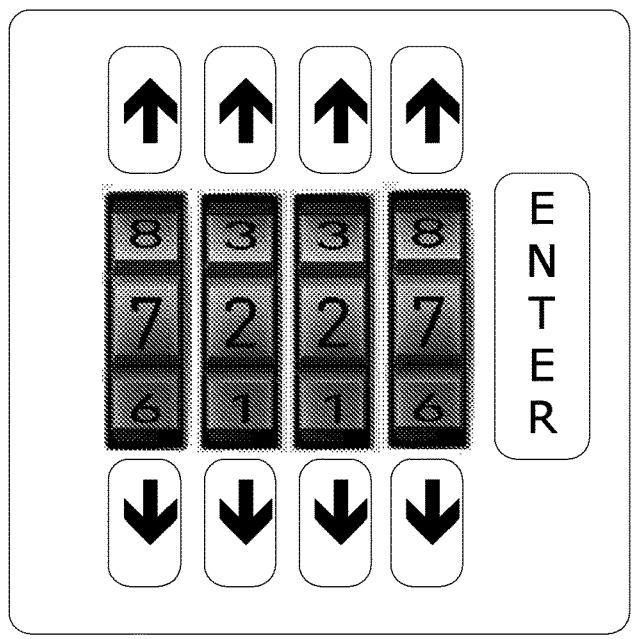
FIG. 11 depicts an exemplary graphical interface according to one embodiment.
Figure 12:
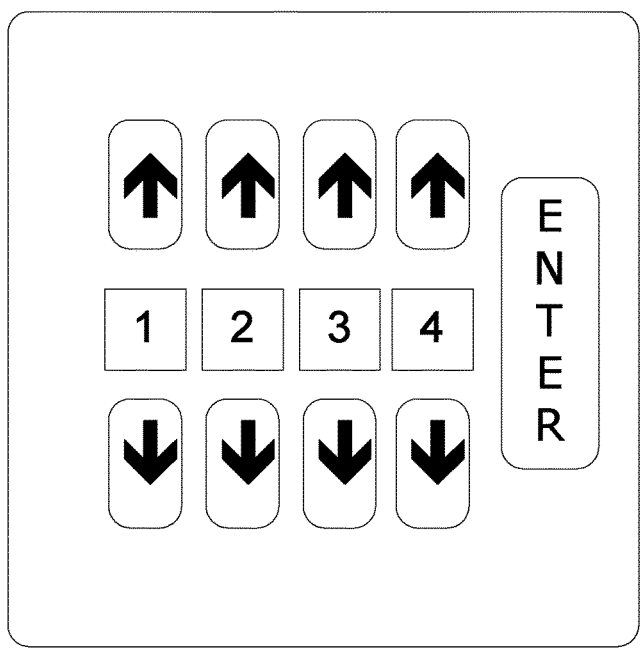
FIG. 12 depicts an exemplary graphical interface according to another embodiment.
Figure 13:
FIG. 13 depicts an exemplary graphical interface according to another embodiment.

Referring to FIG. 10, a method for increasing security in authentication code entry for touch-sensitive screen enabled devices is disclosed according to another embodiment. Although this embodiment may be disclosed in the context of the entry of one or more digits of an authentication code, it should be recognized that the digits may be an entry of numbers, characters, symbols, combinations, etc. as necessary and/or desired.

In step 1005, a user may interact with a touch-sensitive screen enabled device that may require entry of an authentication code using a scrolling-wheel-type interface.

In step 1010, one or more virtual scrolling interfaces may be provided, along with the ability to change the value of the digit(s) sequentially. In one embodiment, the value may only increase sequentially, such as in an embodiment in which the user touches the digit to change its value. In another embodiment, the value may increase or decrease sequentially, such as in an embodiment in which virtual keys are provided for increasing and decreasing the value of the digit.

For example, in one embodiment, the graphical interface may have an appearance that is similar to the rotatable wheels of a luggage lock. An exemplary embodiment of such an interface is provided in FIG. 11. Other graphical representations of this interface may be implemented as necessary and/or desired.

In another embodiment, the graphical interface may depict a digit with up and down arrows for increasing or decreasing the value of the digit. An exemplary embodiment is provided in FIG. 12.

In another embodiment, the graphical interface may display the digit(s) of the authentication code without virtual keys for changing the value of the digit(s). The values of the keys can be scrolled through by touching the digit and then moving the touch up or down (or left or right, or any other direction as desired) to select a different value. An exemplary embodiment is provided in FIG. 13.

In step 1015, the touch-sensitive screen may detect a touch indicating that the value of a digit is to change, and in step 1020, the value of the digit may be increased or decreased based on the touch.

For example, in one embodiment, the user may change (e.g., sequentially increase or sequentially decrease) the value of the digit displayed by touching the area or position at which the digit is displayed. For example, if the digit is the number "2," the digit displayed may change to "3" in response to the user touching the position or area at which the digit is displayed. Thus, in this embodiment, one area will generally receive fingerprints/touch marks during selection of the digit, and this area may not have a discernable association with a digit in an authentication code.

In one embodiment, the user may change the value of the digit using up and down virtual keys. Thus, in this embodiment, two areas will generally receive fingerprints/touch marks during selection of the digit, and these areas may not have any discernable association with a digit in an authentication code.

In another embodiment, the user may swipe or flick up or down, left or right, to change the value of the digit that is displayed. A flicking or swiping motion in any direction allowed (e.g., up, down, right or left) may cause the interface to scroll through the possible digit selections in a rapid or continuous fashion, similar to a spinning wheel.

In step 1025, a touch may be sensed that indicates that user is accepting the one or more digits that are displayed. In one embodiment, when the user has entered all digits of the authentication code, the user may touch the "enter" virtual key. In another embodiment, the user may touch the position of the digit to enter the digit. In another embodiment, the digit may be deemed entered after the passage of a predetermined amount of time. Any suitable manner of accepting the digit(s) may be used as is necessary and/or desired.

If the touch does not indicate that user is accepting the one or more digits that are displayed, the selection of the digit(s) may continue.

In one embodiment, after being accepted, the digit may be displayed for a predetermined period of time and may then be replaced with a symbol (e.g., an asterisk) so that the digit(s) of the authentication code are not displayed at the same time.

In step 1020, once all digit(s) are accepted, the digit(s) may be entered as an authentication code.

Figure 14:
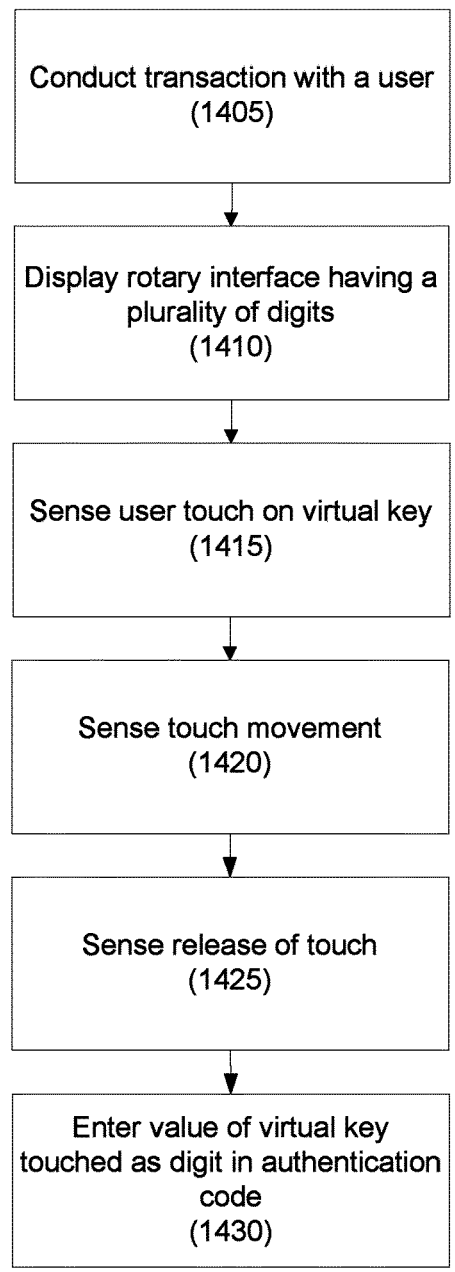
FIG. 14 depicts a method for increased security in authentication code entry for touch-sensitive screen enabled devices according to another embodiment.

Referring to FIG. 14, a method for increasing security in authentication code entry for touch-sensitive screen enabled devices is disclosed according to another embodiment. Although this embodiment may be disclosed in the context of the entry of one or more digits of an authentication code, it should be recognized that the digits may be an entry of numbers, characters, symbols, combinations, etc. as necessary and/or desired.

In step 1405, a user may conduct a transaction with a user that may require the entry of an authentication code.

Figure 15:
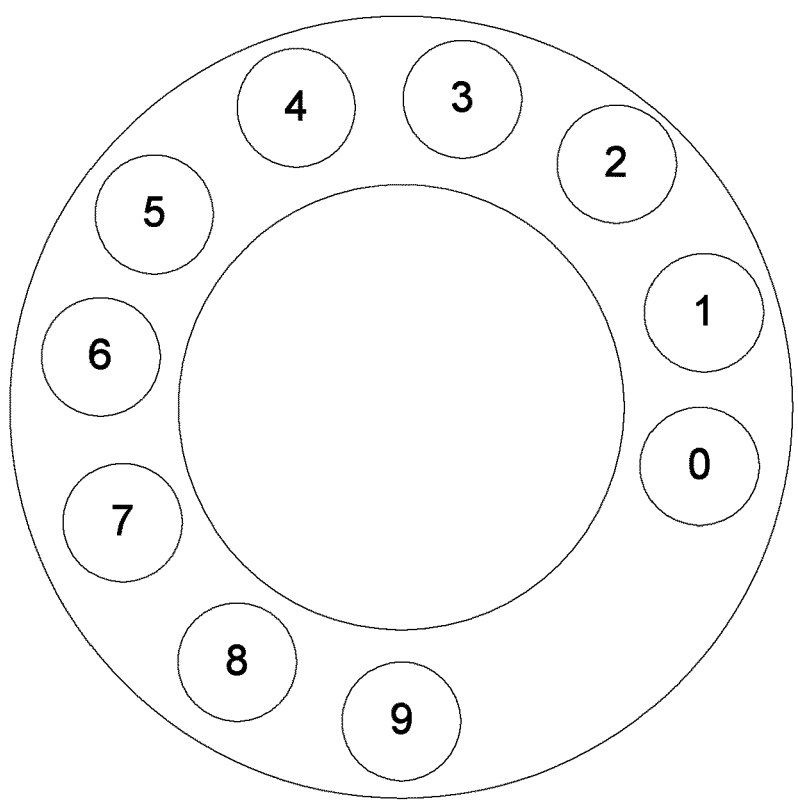
FIG. 15 depicts an exemplary graphical interface according to another embodiment.

In step 1410, a graphical rotary-type interface may be provided for user interaction. In one embodiment, the rotary-type interface may be similar to a rotary dial on a telephone. In one embodiment, the digits associated with the virtual keys may be arranged so that each digit's position relative to the other digits is maintained. For example, the digits may sequentially increase in value in a counterclockwise direction from 1-0, as illustrated in FIG. 15. With each touch, or after entry of a complete authentication code, however, the position of the digits may change, while the sequential relationship is maintained. Thus, the "1" digit will be followed by the "2" digit, which will be followed by the "3" digit, etc. as one moves in the counterclockwise direction regardless of where the digits are positioned.

In another embodiment, the virtual keys may maintain the same position.

In another embodiment, the digits on the virtual keys may be randomly placed.

Other graphical representations of this interface may be implemented as necessary and/or desired.

In step 1415, the touch-sensitive screen may detect a touch of a virtual key, and in step 1420, a movement of the touch may be detected. In one embodiment, the movement may be a continuous touch (e.g., a swipe) in the clockwise direction, similar to dialing a rotary phone. In another embodiment, the movement may be a swipe in the counter-clockwise direction. In another embodiment, the movement may be in any suitable direction. In one embodiment, the length and/or duration of the touch may be required to be above a certain threshold. In one embodiment, once the touch has reached the threshold, feedback (e.g., haptic, audible, etc.) may be provided for the user.

In one embodiment, the virtual keys may be displayed as rotating with the swipe, similar to the manner in which a rotary telephone dial rotates.

In one embodiment, the swipe may distort or obfuscate existing fingerprints/touch marks on the touch-sensitive screen.

In step 1425, a release of the touch may be sensed. In one embodiment, the release of the touch may be an indication that the user is accepting the one virtual key that the user touched. In one embodiment, feedback (e.g., audible, haptic, visual, etc.) may be provided to indicate the acceptance or rejection of the digit.

In one embodiment, if the length or duration of the touch is not above a threshold, the virtual key touch may be rejected.

In one embodiment, after being accepted, the digit may be displayed for a predetermined period of time and may then be replaced with a symbol (e.g., an asterisk) so that the digit(s) of the authentication code are not displayed at the same time.

In step 1430, once all digit(s) are accepted, the digit(s) may be entered as an authentication code. For example, in one embodiment, when the user has entered all digits of the authentication code, the user may touch an "enter" virtual key. Any suitable manner of accepting the digit(s) may be used as is necessary and/or desired.

The disclosure of WO 2017/091558 is hereby incorporated, by reference, in its entirety.

It will be appreciated by those skilled in the art that the various embodiments are not limited by what has been particularly shown and described hereinabove. Rather the scope of the various embodiments includes both combinations and sub-combinations of features described hereinabove and variations and modifications thereof which are not in the prior art. It should further be recognized that these various embodiments are not exclusive to each other.

It will be readily understood by those persons skilled in the art that the embodiments disclosed here are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the above description.

Accordingly, while the various embodiments have been described here in detail in relation to exemplary embodiments, it is to be understood that this disclosure is only illustrative and exemplary and is made to provide an enabling disclosure. Accordingly, the foregoing disclosure is not intended to be construed or to limit the various embodiments or otherwise to exclude any other such embodiments, adaptations, variations, modifications or equivalent arrangements.

What is claimed is:

1. A method for enhanced security in entering data to a data entry device comprising at least one computer processor and a touch-sensitive screen, comprising:
   the at least one computer processor generating a touch instruction to add fingerprint marks or touch marks to the touch-sensitive screen;
   the touch-sensitive screen displaying the touch instruction, the touch instruction indicating a touch location where a user touch is to be made on the touch-sensitive screen to add the fingerprint marks or touch marks;
   the touch-sensitive screen sensing a first touch; and
   the at least one computer processor determining that the first touch is within a predetermined threshold of the touch location indicated by the touch instruction.

2. The method of claim 1, wherein the touch instruction instructs the user to traverse a portion of the touch-sensitive screen with the user touch; and the method further comprises the at least one computer processor determining that the first touch traverses the portion of the touch-sensitive screen indicated by the touch instruction within a predetermined threshold of the touch instruction.

3. The method of claim 2, further comprising:
   the at least one computer processor determining that the sensed touch is continuous.

4. The method of claim 1, wherein the touch instruction is generated to add to or obfuscate existing fingerprints or touch marks on the touch-sensitive screen from at least one previous touch sensed by the touch-sensitive screen based on the location of the at least one previous touch sensed by the touch-sensitive screen.

5. The method of claim 1, wherein the touch-sensitive screen displays a virtual keypad comprising a plurality of virtual keys, and the touch instruction is based on a number of virtual keys that will be traversed by the touch instruction.

6. The method of claim 1, wherein the touch instruction is a symbol displayed on the touch-sensitive screen.

7. The method of claim 1, further comprising:
   the at least one computer processor generating a second touch instruction to add second fingerprint marks or touch marks to the touch-sensitive screen based on the location of the first touch; and
   the touch-sensitive screen displaying the second touch instruction indicating a second touch location where a user is to touch the touch-sensitive screen to add the second fingerprint marks or touch marks.

8. The method of claim 1, further comprising:
the touch-sensitive screen receiving an authentication code.

9. The method of claim 1, wherein the data entry device comprises a point of sale device.

10. A data entry device comprising:
a touch-sensitive screen;
a memory; and
at least one computer processor;
wherein:
the at least one computer processor generates a touch instruction to add fingerprint marks or touch marks to the touch-sensitive screen;
the touch-sensitive screen displays the touch instruction, the touch instruction indicating a touch location where a user touch is to be made on the touch-sensitive screen to add the fingerprint marks or touch marks;
the touch-sensitive screen senses a first touch; and
the at least one computer processor determines that the first touch is within a predetermined threshold of the touch location indicated by the touch instruction.

11. The data entry device of claim 10, wherein the touch instruction instructs the user to traverse a portion of the touch-sensitive screen with the user touch, and the at least one computer processor determines that the first touch traverses the portion of the touch-sensitive screen indicated by the instruction within a predetermined threshold of the touch instruction.

12. The data entry device of claim 11, wherein the at least one computer processor determines that the sensed touch is continuous.

13. The data entry device of claim 10, wherein the at least one computer processor generates the touch instruction to add to or obfuscate existing fingerprints or touch marks on the touch-sensitive screen from at least one previous touch sensed by the touch-sensitive screen based on the location of the at least one previous touch sensed by the touch-sensitive screen.

14. The data entry device of claim 10, wherein the touch-sensitive screen displays a virtual keypad comprising a plurality of virtual keys, and the touch instruction is based on a number of virtual keys touched by the touch instruction.

15. The data entry device of claim 10, wherein the touch instruction is a symbol displayed on the touch-sensitive screen.

16. The data entry device of claim 10, wherein the at least one computer processor generates a second touch instruction to add second fingerprint marks or touch marks to the touch-sensitive screen based on the location of the first touch, and the touch-sensitive screen displays the second touch instruction indicating a second touch location where a user is to touch the touch-sensitive screen to add the second fingerprint marks or touch marks.

17. The data entry device of claim 10, wherein the touch-sensitive screen receives an authentication code.

18. The data entry device of claim 10, wherein the data entry device comprises a point of sale device.

19. The data entry device of claim 10, wherein at least one of the at least one computer processor comprises a touch-sensitive screen controller.

* * * * *